United States Patent
Yotam et al.

(10) Patent No.: US 12,511,120 B2
(45) Date of Patent: Dec. 30, 2025

(54) FUNCTION AS A SERVICE FUSION DEPLOYMENT

(71) Applicant: Dell Products L.P., Round Rock, TX (US)

(72) Inventors: Yair Yotam, Beer Sheva (IL); Boris Shpilyuck, Ashdod (IL); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 18/352,736

(22) Filed: Jul. 14, 2023

(65) Prior Publication Data

US 2025/0021329 A1    Jan. 16, 2025

(51) Int. Cl.
| | |
|---|---|
| *G06F 8/71* | (2018.01) |
| *G06F 8/36* | (2018.01) |
| *G06F 8/60* | (2018.01) |

(52) U.S. Cl.
CPC ............ *G06F 8/71* (2013.01); *G06F 8/36* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 12,353,866 | B2 * | 7/2025 | Ramraz | G06F 8/63 |
| 2023/0315888 | A1 * | 10/2023 | Ishida | G06F 8/60 |
| | | | | 726/26 |
| 2025/0021232 | A1 * | 1/2025 | Ryu | G06F 3/0689 |
| 2025/0021329 | A1 * | 1/2025 | Yotam | G06F 8/71 |
| 2025/0021382 | A1 | 1/2025 | Yotam et al. | |
| 2025/0021403 | A1 | 1/2025 | Yotam et al. | |
| 2025/0021406 | A1 | 1/2025 | Yotam et al. | |
| 2025/0138801 | A1 * | 5/2025 | Tang | G06F 8/311 |

OTHER PUBLICATIONS

Wickramanayaka, "Communication-Affinity Aware Colocation and Merging of Containers", 2022, International Journal on Advances in ICT for Emerging Regions (Year: 2022).*

Keller, "Virtualizing the Data Plane Through Source Code Merging", 2008, ACM (Year: 2008).*

* cited by examiner

*Primary Examiner* — Hossain M Morshed

(74) *Attorney, Agent, or Firm* — Amin, Turocy & Watson, LLP

(57) ABSTRACT

A system can determine that a first containerized function invokes a second containerized function. The system can access first source code of the first containerized function from a repository. The system can access second source code of the second containerized function from the repository. The system can package the first source code and the second source code into an image that comprises a container in which the first source code and the second source code are configured to execute. The system can deploy the image to produce a deployed image. The system can terminate a first executing instance of the first containerized function. The system can terminate a second executing instance of the second containerized function. The system can direct a first call to invoke the first containerized function to the deployed image. The system can direct a second call to invoke the second containerized function to the deployed image.

20 Claims, 11 Drawing Sheets

1000

(1002)

↓

DETERMINING THAT A FIRST CONTAINERIZED FUNCTION OF A GROUP OF CONTAINERIZED FUNCTIONS INVOKES A SECOND CONTAINERIZED FUNCTION OF THE GROUP OF CONTAINERIZED FUNCTIONS 1004

↓

ACCESSING FIRST SOURCE CODE OF THE FIRST CONTAINERIZED FUNCTION AND SECOND SOURCE CODE OF THE SECOND CONTAINERIZED FUNCTION FROM A REPOSITORY 1006

↓

PACKAGING THE FIRST SOURCE CODE AND THE SECOND SOURCE CODE INTO A CONTAINER IN WHICH THE FIRST SOURCE CODE AND THE SECOND SOURCE CODE ARE CONFIGURED TO EXECUTE 1008

↓

DEPLOYING THE CONTAINER TO PRODUCE A DEPLOYED CONTAINER 1010

↓

DIRECTING A FIRST CALL TO INVOKE THE FIRST CONTAINERIZED FUNCTION TO THE DEPLOYED CONTAINER 1012

↓

DIRECTING A SECOND CALL TO INVOKE THE SECOND CONTAINERIZED FUNCTION TO THE DEPLOYED CONTAINER 1014

FUNCTION AS A SERVICE FUSION DEPLOYMENT

RELATED APPLICATIONS

The subject patent application is related by subject matter to, U.S. patent application Ser. No. 18/352,757, filed Jul. 14, 2023 and entitled "FUNCTION AS A SERVICE FUSION DEPLOYMENT," the entirety of which application is hereby incorporated by reference herein.

The subject patent application is related by subject matter to, U.S. patent application Ser. No. 18/352,805, filed Jul. 14, 2023 and entitled "FUNCTION AS A SERVICE FUSION DEPLOYMENT WITH POLYGLOT FUNCTIONS," the entirety of which application is hereby incorporated by reference herein.

BACKGROUND

A computer function can generally comprise a portion of computer-executable code that performs a task, and can be distinguished from a pure mathematical function.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine that a first containerized function of a group of containerized functions invokes a second containerized function of the group of containerized functions. The system can access first source code of the first containerized function from a repository. The system can access second source code of the second containerized function from the repository. The system can package the first source code and the second source code into an image that comprises a container in which the first source code and the second source code are configured to execute. The system can deploy the image to produce a deployed image. The system can terminate a first executing instance of the first containerized function. The system can terminate a second executing instance of the second containerized function. The system can direct a first call to invoke the first containerized function to the deployed image. The system can direct a second call to invoke the second containerized function to the deployed image.

An example method can comprise determining, by a system comprising a processor, that a first containerized function of a group of containerized functions invokes a second containerized function of the group of containerized functions. The method can further comprise accessing, by the system, first source code of the first containerized function and second source code of the second containerized function from storage. The method can further comprise packaging, by the system, the first source code and the second source code into an image that comprises a container in which the first source code and the second source code are configured to execute. The method can further comprise deploying, by the system, the image to result in a deployed image. The method can further comprise terminating, by the system, a first executing instance of the first containerized function and a second executing instance of the second containerized function. The method can further comprise directing, by the system, a first call to invoke the first containerized function to the deployed image. The method can further comprise directing, by the system, a second call to invoke the second containerized function to the deployed image.

An example non-transitory computer-readable medium can comprise instructions that, in response to execution, cause a system comprising a processor to perform operations. These operations can comprise determining that a first containerized function of a group of containerized functions invokes a second containerized function of the group of containerized functions. These operations can further comprise accessing first source code of the first containerized function and second source code of the second containerized function from a repository. These operations can further comprise packaging the first source code and the second source code into a container in which the first source code and the second source code are configured to execute. These operations can further comprise deploying the container to produce a deployed container. These operations can further comprise directing a first call to invoke the first containerized function to the deployed container. These operations can further comprise directing a second call to invoke the second containerized function to the deployed container.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 10 illustrates another example process flow that can facilitate FaaS fusion deployment, in accordance with an embodiment of this disclosure;

DETAILED DESCRIPTION

Overview

Figure 1:
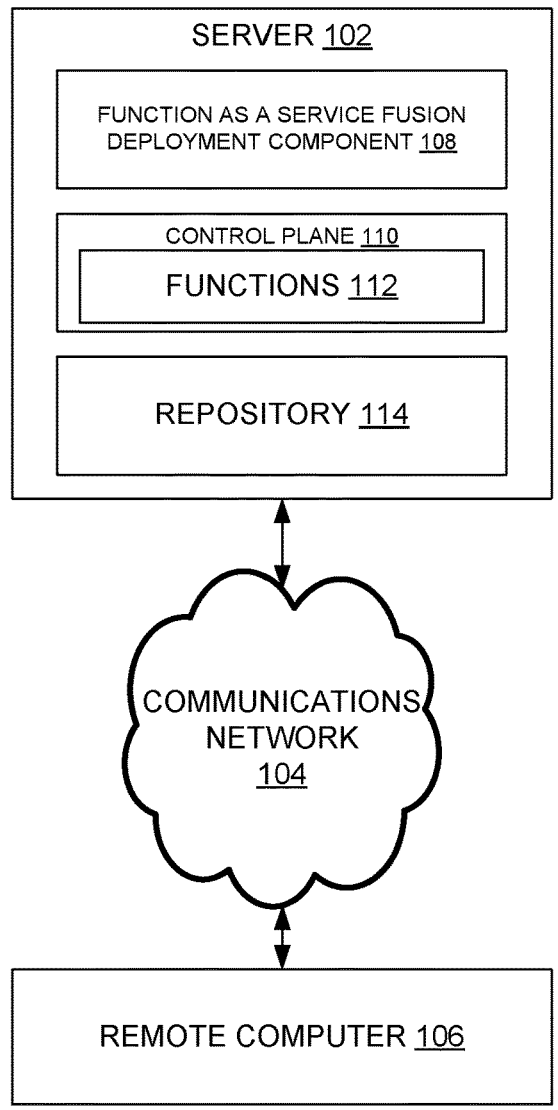
FIG. 1 illustrates an example system architecture that can facilitate Function as a Service (FaaS) fusion deployment, in accordance with an embodiment of this disclosure.

FaaS can comprise a service allocated by a cloud platform to achieve a "serverless" execution model. In this form of execution, a cloud services platform can be leveraged to control most aspects of execution layers, allowing the developer to focus on business logic.

Using a FaaS platform to execute code can provide benefits. A benefit can be an improved time to market, where developers are focused on business value rather than operational aspects of deployment and maintenance, which can facilitate faster development cycles.

Another benefit can relate to compute resources and cost. A characteristic of containerized functions can be ephemerality, where functions can be short-lived and can scale to zero. Using a FaaS platform can benefit a system in terms of cost and compute resources, where some part of an application remains dormant until needed.

A problem with FaaS can relate to cascading execution of functions. In an example, functions can call each other serially to consume some business logic. These calls can increase an overall execution time, where each function is provisioned separately.

Consider an example where there are three deployed functions: F1( ), F2( ), and F3( ). There can be different initialization times for each function based on their respective code base. In this example, F1( ) can have a 200 millisecond (ms) initialization time, F2( ) can have a 300 ms initialization time, and F3( ) can have a 400 ms initialization time.

If these functions are initialized serially, a corresponding user request will be idle for nearly a second.

These deployment side effects can be difficult to predict during development, and can cause a major increase in cost and resources in production.

Another problem with FaaS can relate to increased resource consumption. Deploying an entire application as separate functions can result in increased resource consumption when part of the application is used occasionally, contrary to a traditional deployment. When functions are not scaled to zero, an advantage of using a serverless execution model can be lost.

Another problem with FaaS can relate to low performance. Serial execution of functions can lead to an increased execution time where each function in the pipeline needs to be provisioned separately. Provisioning can be slower in certain runtimes resulting in low performance and more idle time until the event is processed.

The present techniques can be implemented to mitigate against these problems with FaaS. In some examples according to the present techniques, a system dynamically collects information of deployed functions, and performs a fusion of multiple functions into a single container. This approach can facilitate reusing a management part of a PaaS platform in a single container, which can reduce costs and resources.

The present techniques can be implemented as follows. A system can perform analysis to identify cascading function calls, can fuse the corresponding functions together, and will trigger a deployment in order for changes to take effect.

In some examples, the system can have two possible modes of analyzing and deploying cascading function calls-static and dynamic. Static analysis can be based on recognizing interrelated function calls in source code. Dynamic analysis can be based on recognizing cascading function calls based on metrics collected during runtime.

In some examples, either static analysis or dynamic analysis can be implemented based on the characteristics of a system that executes the functions.

Implementing the present techniques can reduce compute resources used in executing functions by merging functions together into a single container. The present techniques can facilitate applying a dynamic behavior to a deployed application, while avoiding problems in legacy approaches of application deployment from microservice or monolithic perspectives.

The proposed solution demonstrates the ability to reduce compute resources by merging one or more functions together to a single container. This approach allows a more dynamic behavior to deployed application while avoiding problems in legacy approaches of application deployment from microservice or monolithic perspectives.

The present techniques can facilitate dynamic FaaS reallocation to collect runtime execution information to identify optimized function execution groups. The present techniques can also facilitate fuse containerized functions that merge functions after deployment into a single container.

Example Architectures

FIG. 1 illustrates an example system architecture 100 that can facilitate FaaS fusion deployment in accordance with an embodiment of this disclosure.

System architecture 100 comprises server 102, communications network 104, and remote computer 106. In turn, server 102 comprises FaaS fusion deployment component 108, control plane 110 (which comprises functions 112), and repository 114.

Each of server 102 and/or remote computer 106 can be implemented with part(s) of computing environment 1200 of FIG. 12. Communications network 104 can comprise a computer communications network, such as the Internet.

Control plane 110 can generally manage deployed functions 112. Respective functions of functions 112 can comprise computer-executable code that can be invoked. Repository 114 can store uncompiled code of functions 112 that can be compiled and deployed to control plane 110.

Remote computer 106 can contact server 102 via communications network 104 to invoke functions of functions 112, such as those that comprise a web application. FaaS fusion deployment component 108 can identify functions of functions 112 that can be merged, or fused, into one container and effectuate that fusion.

Figure 6:
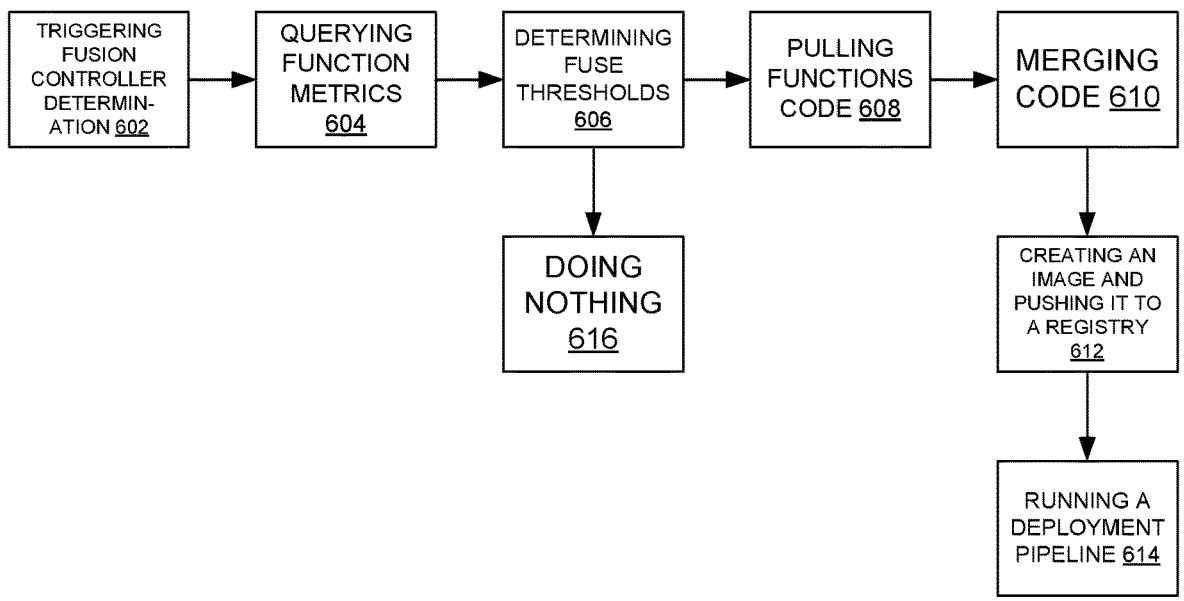
FIG. 6 illustrates an example process flow for dynamic function analysis that can facilitate FaaS fusion deployment, in accordance with an embodiment of this disclosure.

In some examples, FaaS fusion deployment component 108 can implement part(s) of the process flows of FIGS. 6 and/or 8-10 to implement FaaS fusion deployment.

It can be appreciated that system architecture 100 is one example system architecture for generating and distributing security policies in a containerized environment, and that there can be other system architectures that facilitate generating and distributing security policies in a containerized environment.

Figure 2:
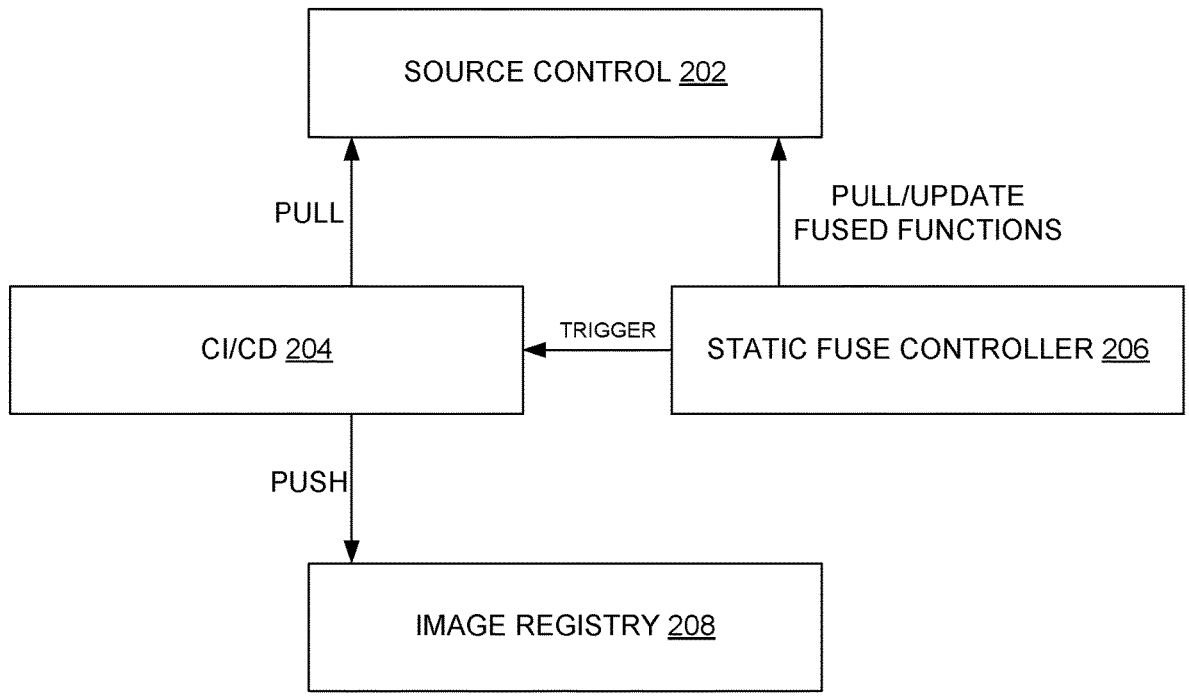
FIG. 2 illustrates an example system architecture for static function analysis that can facilitate FaaS fusion deployment, in accordance with an embodiment of this disclosure.

FIG. 2 illustrates an example system architecture 200 that for static function analysis that can facilitate FaaS fusion deployment, in accordance with an embodiment of this disclosure. In some examples, part(s) of system architecture 200 can be used to implement part(s) of system architecture 100 of FIG. 1 to facilitate FaaS fusion deployment.

System architecture 200 comprises source control 202, continuous integration (CI)/continuous deployment (CD) 204, static fuse controller 206, image registry 208, and FaaS fusion deployment component 210.

Source control 202 can be similar to repository 114 of FIG. 1. CI/CD 204 can generally comprise a component that integrates changes to code for a containerized function, and then deploys an image of that containerized function to image registry 208. Image registry 208 can comprise a registry of function container images that can be instantiated and executed when the corresponding function is invoked. FaaS fusion deployment component 210 can be similar to FaaS fusion deployment component 108 of FIG. 1.

Static analysis and provisioning can be performed as follows. Static analysis can be performed on a function's code base to identify areas where there are cascading calls to different functions.

In some examples, static analysis can generally be performed in three parts: perform code analysis from source control and function call graph; decide a function merge strategy; and merge the functions and push updates.

Figure 3:
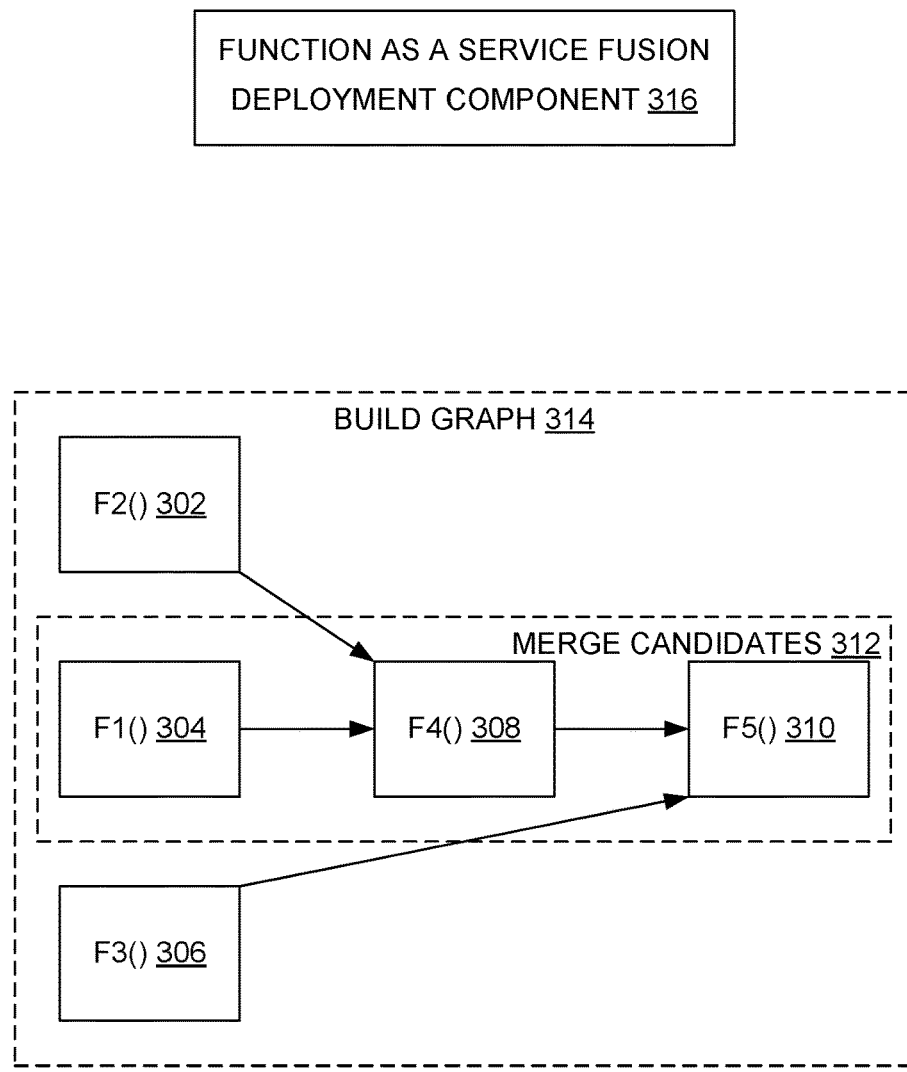
FIG. 3 illustrates another example system architecture for static function analysis that can facilitate FaaS fusion deployment, in accordance with an embodiment of this disclosure.

Static fuse controller 206 can generally be responsible for iterating over function code modules and building a function call graph (similar to FIG. 3). A FaaS platform that manages the functions can also be responsible for wrapping the runtime components in dedicated network handlers (e.g., services), which can facilitate static fuse controller 206 in identifying calls inside the code to different functions and building the execution graph.

FIG. 3 illustrates another example system architecture 300 for static function analysis that can facilitate FaaS fusion deployment, in accordance with an embodiment of this disclosure. In some examples, part(s) of system architecture 300 can be used to implement part(s) of system architecture 100 of FIG. 1 to facilitate FaaS fusion deployment.

System architecture 300 comprises FaaS fusion deployment component 316, and build graph 314. In turn, build graph 314 comprises F2( ) 302, F1( ) 304, F3( ) 306, F4( ) 308, F5( ) 310, and merge candidates 312. FaaS fusion deployment component 316 can be similar to FaaS fusion deployment component 108 of FIG. 1.

Build graph 314 can comprise a graph of functions and their dependencies that is generated based on a static analysis of those functions' code. Here, there are five functions analyzed, and used to make nodes in build graph 314-F2( ) 302, F1( ) 304, F3( ) 306, F4( ) 308, F5( ) 310. F1( ) 304, F4( ) 308, and F5( ) 310 can be identified as potential merge candidates 312 because they have been identified to be part of a cascading series of function calls. That is, in this example, F1( ) 304 invokes F4( ) 308; and similarly, F4( ) 308 invokes F5( ) 310.

Build graph 314 can be used to identify a maximum depth possible to merge groups of functions.

Build graph 314 can be used to determine to merge F1( ) 304, F4( ) 308, and F5( ) 310, to save a potential idle time in a function cold start. In some examples, F2( ) 302 and F3( ) 306 can also be added, though it could be that this causes initialization time to stack up and exceed a time of serial execution.

Where F2( ) 302 and F3( ) 306 are to be executed in parallel, they can be kept outside of a fused container.

In some examples, a static fuse controller (e.g., static fuse controller 206 of FIG. 2) can identify potential function size and package testing. For example, functions that contain a large code base and packages can be prioritized over functions with a smaller footprint when deciding on a merge strategy of functions in a same depth.

After code is merged back into source control as fused functions, a pipeline can be triggered to build a new image and store it in an image registry. A CI/CD component (e.g., CI/CD 204 of FIG. 2) can override previously deployed functions to prevent building and deploying them.

Figure 4:
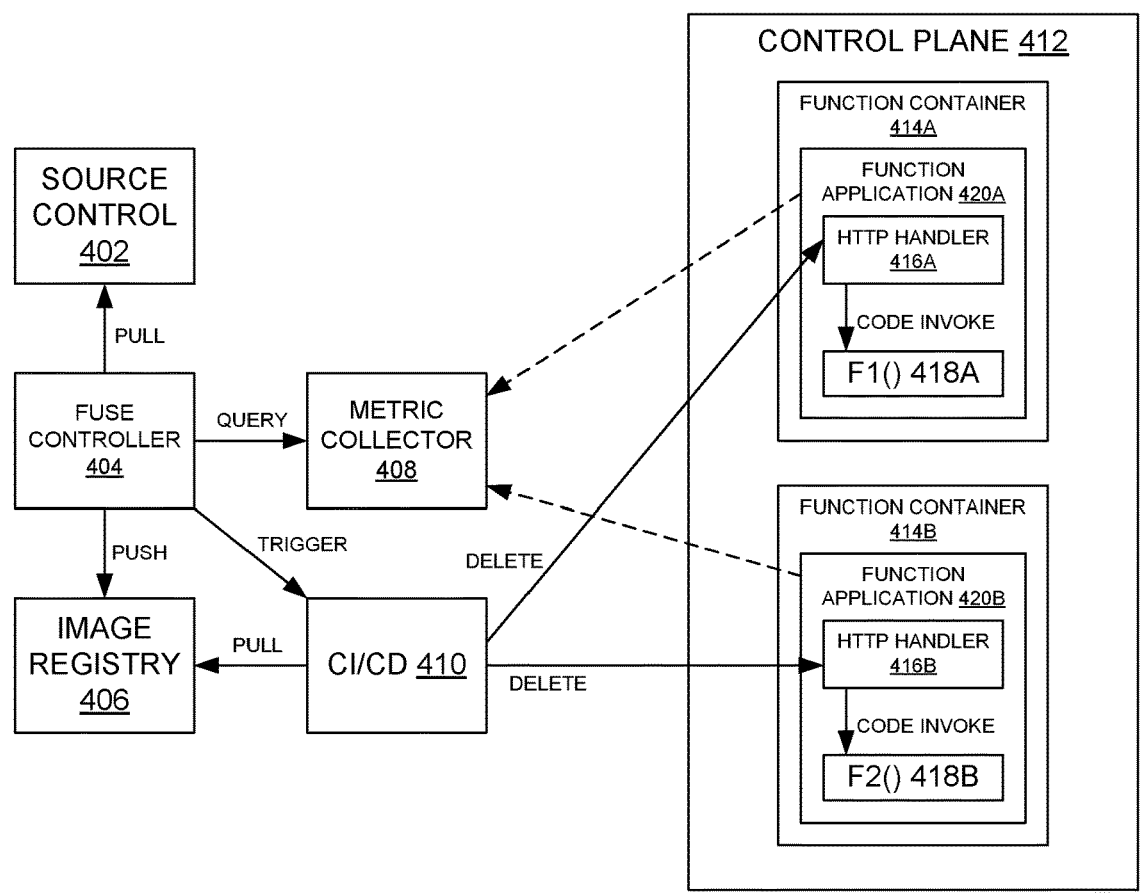
FIG. 4 illustrates an example system architecture for dynamic function analysis that can facilitate FaaS fusion deployment, in accordance with an embodiment of this disclosure.

FIG. 4 illustrates an example system architecture 400 for dynamic function analysis that can facilitate FaaS fusion deployment, in accordance with an embodiment of this disclosure. In some examples, part(s) of system architecture 400 can be used to implement part(s) of system architecture 100 of FIG. 1 to facilitate FaaS fusion deployment.

Generally, FIG. 4 can depict an example where multiple functions execute in separate containers. That is, F1( ) 418A executes in function container 414A, and F2( ) 418B executes in function container 414B. Then, generally, FIG. 5 can depict the example of FIG. 4 after the two functions have been fused to execute within one container. In the example of FIG. 4, F1( ) 418A and F2( ) 418B can be analyzed to determine that they will be fused.

System architecture 400 comprises source control 402, fuse controller 404, image registry 406, metric collector 408, CI/CD 410, and control plane 412. In turn, control plane 412 comprises function container 414A, hypertext transfer protocol (HTTP) handler 416A (it can be appreciated that this is an example, and other types of handlers can be implemented), F1( ) 418A, function application 420A, function container 414B, HTTP handler 416B, F2( ), and function application 420B.

Source control 402 can be similar to source control 202 of FIG. 2. Fuse controller 404 can be similar to static fuse controller 206, except that fuse controller 404 is configured to fuse functions based on dynamic analysis while static fuse controller 206 is configured to fuse functions based on static analysis. Image registry 406 can be similar to image registry 406.

Metric collector 408 can be a component that is configured to measure dynamic metrics of functions in control plane 412, as described herein. CI/CD 410 can be similar to CI/CD 204. Control plane 412 can generally manage functions deployed by CI/CD 410.

Each of function container 414A and function container 414B can comprise a container, where a container can generally package executable computer code (e.g., a function) with libraries and dependencies that are invoked by the code. HTTP handler 416A and HTTP handler 416B can each comprise a management layer for a FaaS platform that is configured to process HTTP messages. F1( ) 418A and F2( ) 418B can be different functions. Function application 420A and function application 420B can comprise a part of function container 414A and function container 414B that supports execution of a function.

Dynamic analysis and provisioning can be implemented as follows. In some examples, static code analysis can be implemented where there are limited compute resources on a runtime environment, but it can be that there are limited results for function fusing because the data used to determine which functions to fuse is not based on live events.

In other examples, more compute resources in production can be used to make a fusion decision in an initial evaluation period through dynamic analysis.

In some examples, dynamic analysis can generally be performed in three parts: collecting metric data from a runtime environment (e.g., by metric collector 408); identifying when a set of functions can be fused together using collected data (e.g., by fuse controller 404); and fusing functions and running a CI/CD pipeline (e.g., CI/CD 410) to deploy the fused functions and delete a previous revision (e.g., by fuse controller 404).

Control plane 412 can generally comprise a deployment environment, and can be part of a container orchestrator. Functions (e.g., F1( ) 418A and F2( ) 418B) can be deployed inside containers. In some examples, each function can have a management layer for a FaaS platform, and this management layer can be implemented as a HTTP request handler (e.g., HTTP handler 416A and HTTP handler 416B).

Metric collector 408 can pull runtime execution data for functions or a platform in order to use that information to make a fusion decision.

Fuse controller 404 can pull metric data (e.g., from metric collector 408) and analyze the data to make a decision on which functions or function groups to merge. In some examples, fuse controller 404 can take into account the following information in determining a merge strategy:

1. Whether the functions are called above a threshold percentage of the time together, where the threshold is a predefined system parameter;
2. Whether the functions are called within a threshold amount of time of each other, where the threshold is a predefined system parameter;
3. Sampling that is collected through a time period, where a decision is made after the time period, and the time period is a predefined system parameter;
4. Sampling that is collected through a number of requests, where the number of requests is a predefined system parameter.

In some examples, other metrics can be utilized.

Where a decision is made to merge or repackage functions, fuse controller 404 can pull the code of the functions and package it together in one image. A new image can then be built from merged code and a CI/CD pipeline (e.g., CI/CD 410) can be triggered to deploy the new image and delete corresponding existing functions.

Figure 5:
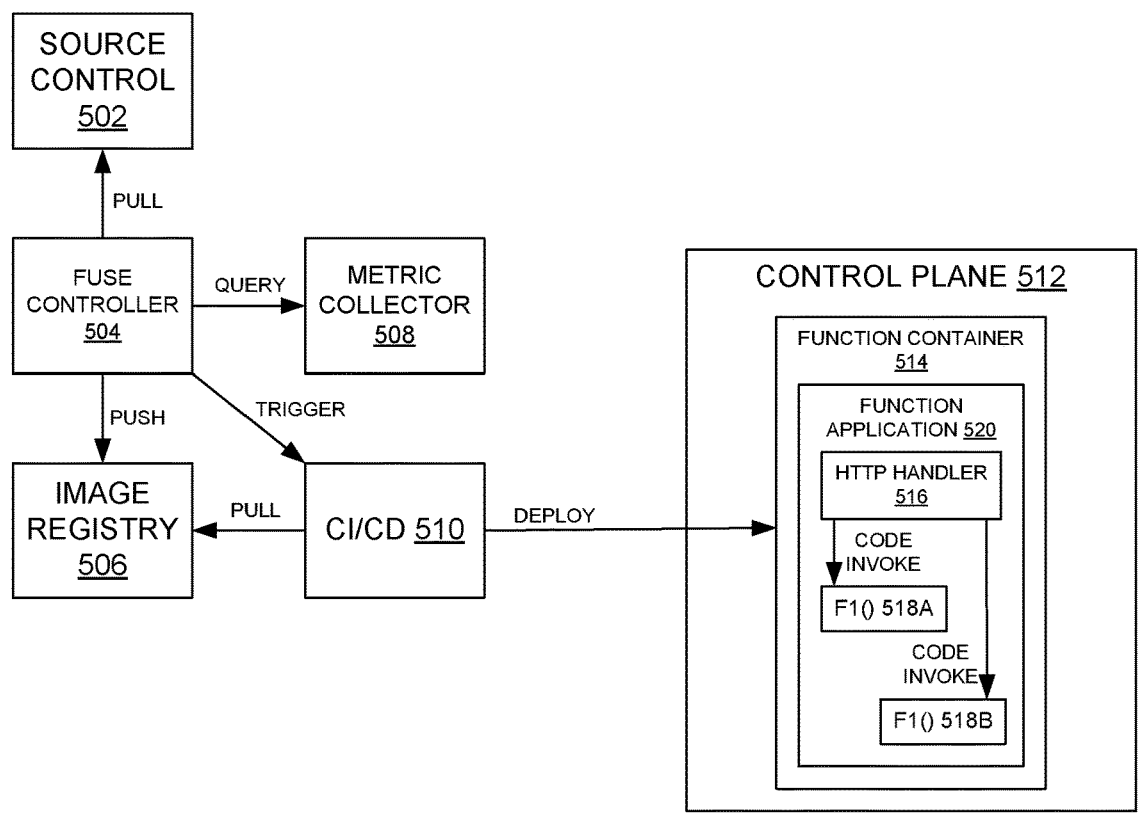
FIG. 5 illustrates another example system architecture for dynamic function analysis that can facilitate FaaS fusion deployment, in accordance with an embodiment of this disclosure.

FIG. 5 illustrates another example system architecture 500 for dynamic function analysis that can facilitate FaaS fusion deployment, in accordance with an embodiment of this disclosure. In some examples, part(s) of system architecture 500 can be used to implement part(s) of system architecture 100 of FIG. 1 to facilitate FaaS fusion deployment.

System architecture 500 comprises source control 502, fuse controller 504, image registry 506, metric collector 508, CI/CD 510, and control plane 512. In turn, control plane 512 comprises function container 514, HTTP handler 516, F1( ) 518A, F2( ) 518B, and function application 520.

Source control 502 can be similar to source control 402 of FIG. 4; fuse controller 504 can be similar to fuse controller 404; image registry 506 can be similar to image registry 406; metric collector 508 can be similar to metric collector 408; CI/CD 510 can be similar to CI/CD 410; control plane 512 can be similar to control plane 412; function container 514 ca be similar to function container 414A; HTTP handler 516 can be similar to HTTP handler 416A; F1( ) 518A can be similar to F1( ) 418A; F2( ) 518B can be similar to F2( ) 418B; and function application 520 can be similar to function application 420A.

System architecture 500 can represent system architecture 400 after F1( ) 418A and F2( ) 418B have been fused from operating in separate containers (function container 414A and function container 414B, respectively) to operating in one container (function container 514). In system architecture 500, HTTP handler 516 can receive calls for both F1( ) 518A and F2( ) 518B and direct calls to the appropriate function.

Example Process Flow

FIG. 6 illustrates an example process flow 600 for dynamic function analysis that can facilitate FaaS fusion deployment, in accordance with an embodiment of this disclosure. In some examples, one or more embodiments of process flow 600 can be implemented by FaaS fusion deployment component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 800 of FIG. 8, process flow 900 of FIG. 9, and/or process flow 1000 of FIG. 10.

In some examples, process flow 600 can be implemented on system architecture 400 of FIG. 4 to perform the function fusion depicted in system architecture 500 of FIG. 5.

Process flow 600 begins with operation 602. Operation 602 depicts triggering fusion controller determination. In some examples, this can be dynamic analysis that is performed periodically on executing functions, or when functions are initially deployed.

After operation 602, process flow 600 moves to operation 604.

Operation 604 depicts querying function metrics. This can be similar to tasks performed by metric collector 408 of FIG. 4.

After operation 604, process flow 600 moves to operation 606.

Operation 606 depicts determining fuse thresholds. These can be thresholds as described herein. Where in operation 606 it is determined that the fuse thresholds are met, process flow 600 moves to operation 608. Instead, where in operation 606 it is determined that the fuse thresholds are not met, process flow 600 moves to operation 616.

Operation 608 is reached from operation 606 where it is determined that the fuse thresholds are met. Operation 608 depicts pulling functions code. That is, code for the functions that will be fused can be pulled from a repository, such as repository 114 of FIG. 1.

After operation 608, process flow 600 moves to operation 610.

Operation 610 depicts merging code. This can involve merging the code pulled in operation 608 so that it can execute in one controller.

After operation 610, process flow 600 moves to operation 612.

Operation 612 depicts creating an image and pushing it to a registry. This can be an image of the merged code from operation 610, and the registry can be similar to image registry 406 of FIG. 4.

After operation 612, process flow 600 moves to operation 614.

Operation 614 depicts running a deployment pipeline. This can comprise CI/CD 410 of FIG. 4 running a deployment pipeline on the registered image.

After operation 614, process flow 600 ends.

Operation 616 is reached from operation 606 where it is determined that the fuse thresholds are not met. Operation 616 depicts doing nothing. That is, it can be determined at this time not to merge functions, so this instance of process flow 600 can end.

After operation 616, process flow 600 ends.

Example Architecture

Figure 7:
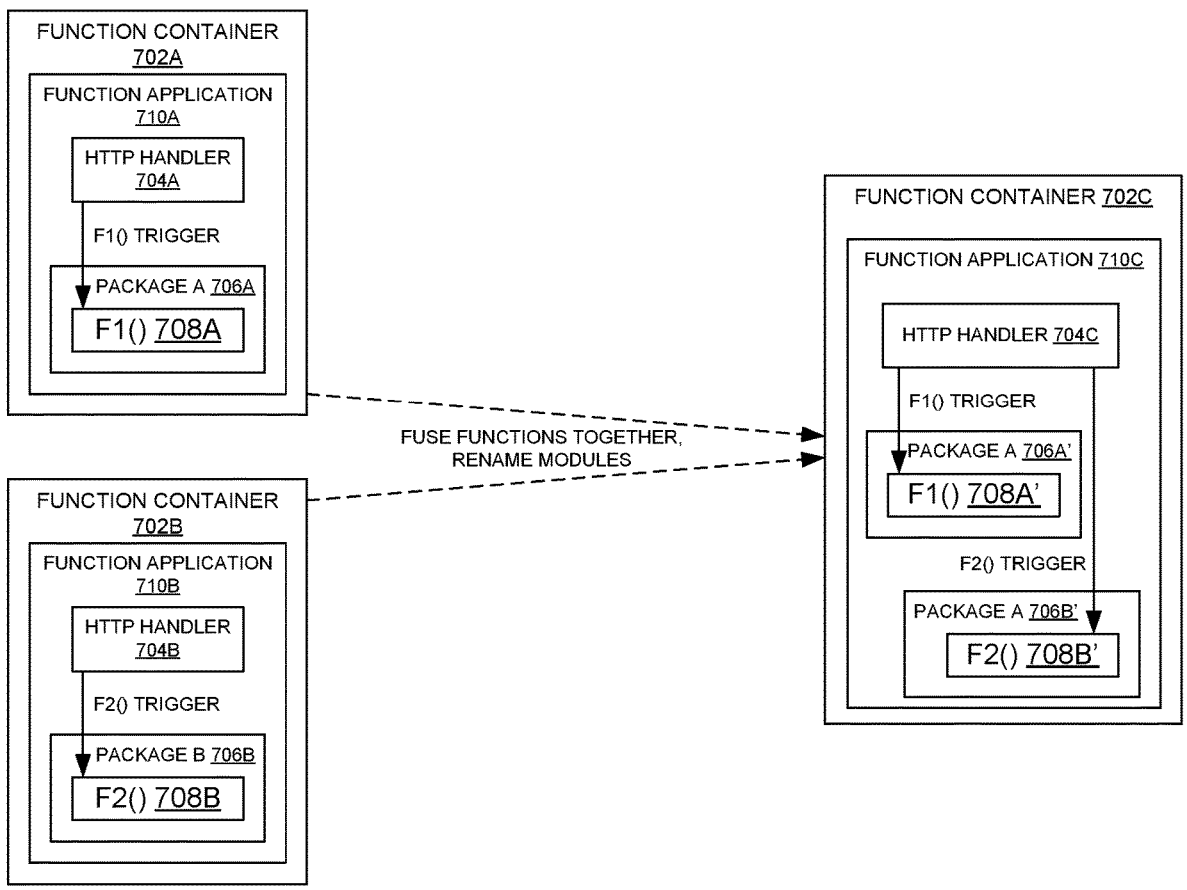
FIG. 7 illustrates an example system architecture for merging functions that can facilitate FaaS fusion deployment, in accordance with an embodiment of this disclosure.

FIG. 7 illustrates an example system architecture 700 for merging functions that can facilitate FaaS fusion deployment, in accordance with an embodiment of this disclosure. In some examples, part(s) of system architecture 700 can be used to implement part(s) of system architecture 100 of FIG. 1 to facilitate FaaS fusion deployment.

System architecture 700 comprises function container 702A, HTTP handler 704A, package A 706A, F1( ) 708A, function application 710A, function container 702B, HTTP handler 704B, package B 706B, F2( ) 708B, function application 710B, function container 702C. HTTP handler 704C, package F1( ) 706A', package F2( ) 706B', F1( ) 708A', F2( ) 708B', and function application 710C.

Function container 702A, function container 702B, and function container 702C can each be similar to an instance of function container 414A of FIG. 4. HTTP handler 704A, HTTP handler 704B, and HTTP handler 704C can each be similar to an instance of HTTP handler 416A. Package A 706A, package F1( ) 706A', package B 706B, and package F2( ) 706B' can each be names for packages that contain functions that can be executed. F1( ) 708A, F2( ) 708B, F1( ) 708A', and F2( ) 708B' can each be functions. Function application 710A, function application 710B, and function application 710B can each be similar to an instance of function application 420A.

A function merge strategy can be implemented as follows. Function dependency packages can be merged, and similar packages can be consolidated. In some cases, packages can automatically be upgraded to a latest version in a case of collision, and in other cases, packages can be manually consolidated. Whether this is done automatically or manually can be configured, and can be done on a per-application basis, such as based on function testability and coverage confidence.

Code for functions can be copied to the same repository. Each function can be wrapped in a different module based on a runtime language (e.g., a package name, or a directory). A HTTP handler (e.g., HTTP handler 704C) can be routed to trigger an appropriate function module according to a compatible function trigger.

A HTTP handler that triggers a single function can now act as a router that maps a function name to a HTTP route or an event name, thus allowing a selective trigger of a relevant function.

Function container 702C generally comprises a merge of the functions of function container 702A and function container 702B. That is, F1( ) 708A and F1( ) 708A' can each be the same function executing in different function containers; and so can F2( ) 708B and F2( ) 708B'. After the merge, two functions-F1( ) 708A' and F2( ) 708B' can execute in one container.

Example Process Flows

Figure 8:
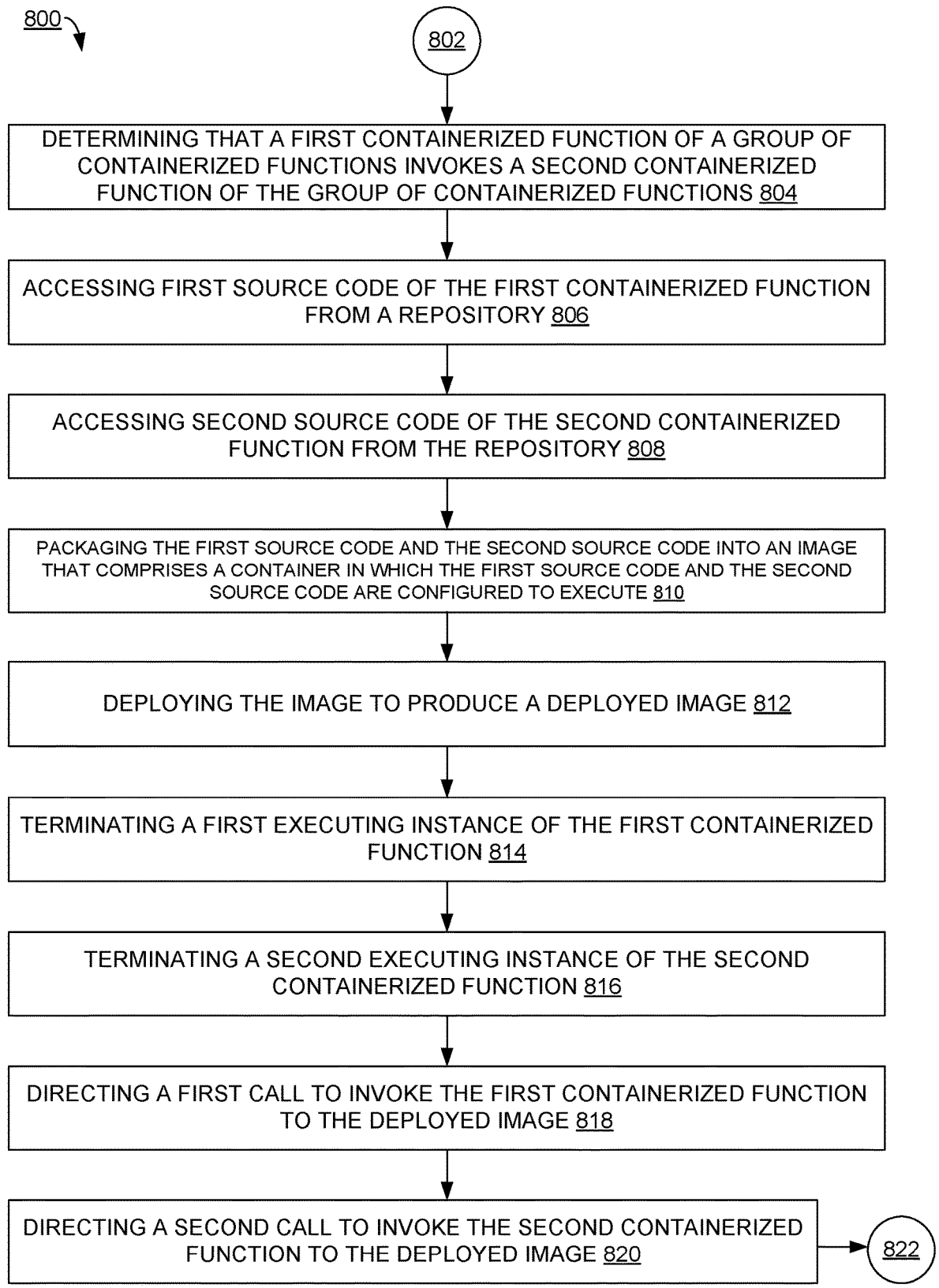
FIG. 8 illustrates an example process flow that can facilitate FaaS fusion deployment, in accordance with an embodiment of this disclosure.

FIG. 8 illustrates an example process flow 800 that can facilitate FaaS fusion deployment, in accordance with an embodiment of this disclosure. In some examples, one or more embodiments of process flow 800 can be implemented by FaaS fusion deployment component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 900 of FIG. 9, and/or process flow 1000 of FIG. 10.

Process flow 800 begins with 802, and moves to operation 804.

Operation 804 depicts determining that a first containerized function of a group of containerized functions invokes a second containerized function of the group of containerized functions. That is, merge candidates among containerized functions can be identified.

In some examples, operation 804 is performed based on a static analysis of the first source code of the first containerized function, and independently of executing the first source code. That is, static analysis can be applied to source code to identify cascading functions.

In some examples, operation 804 comprises generating a graph based on source code of the group of containerized functions, wherein the source code comprises the first source code and the second source code, wherein the graph comprises nodes that represent respective functions of the group of containerized functions and edges that represent invocations between the respective functions, and wherein the static analysis is based on the graph. That is, an execution graph can be generated, which can be used to identify calls within source code to different functions.

In some examples, the graph comprises paths of invocations in the graph, and wherein the static analysis comprises identifying a path of the paths that is a longest path of the paths. That is, there can be a maximum depth possible to merge groups of functions, and in some examples, this can be a parameter set by a user account.

In some examples, respective containerized functions of the group of containerized functions are associated with respective code sizes, and the static analysis is based on the respective code sizes. In some examples, respective containerized functions of the group of containerized functions are associated with respective package sizes, and the static analysis is based on the respective package sizes. That is, in some examples, function size and package nesting can be considered in fusing functions. For example, functions with a large code base and a large number of packages can be prioritized over functions with a smaller code base and/or a smaller number of packages when determining a merge strategy of functions in a same depth.

After operation 804, process flow 800 moves to operation 806.

Operation 806 depicts accessing first source code of the first containerized function from a repository. That is, between operations 806 and 808, the source code for the two functions in operation 804 can be acquired (such as by accessing a repository that stores the source code).

After operation 806, process flow 800 moves to operation 808.

Operation 808 depicts accessing second source code of the second containerized function from the repository. In some examples, operation 808 can be implemented in a similar manner as operation 806, as applied to the second containerized function (compared to the first containerized function in operation 806).

After operation 808, process flow 800 moves to operation 810.

Operation 810 depicts packaging the first source code and the second source code into an image that comprises a container in which the first source code and the second source code are configured to execute. That is, the source code for both functions can be packaged into one container image.

After operation 810, process flow 800 moves to operation 812.

Operation 812 depicts deploying the image to produce a deployed image. That is, the image created in operation 810 can be deployed.

In some examples, the packaging and the deploying are performed by a continuous integration and continuous deployment component. This continuous integration and continuous deployment component can be similar to CI/CD 204 of FIG. 2.

In some examples, the continuous integration and continuous deployment component is configured to, based on the packaging and deploying, prevent building and deploying the first containerized function and the second containerized function in separate containers. That is, it can be that after code is merged back to source control as merged functions, a pipeline can be triggered to build a new image and store it in an image registry. A continuous integration and continuous deployment component can also override previously deployed functions to prevent building and deploying them.

After operation 810, process flow 800 moves to operation 814.

Operation 814 depicts terminating a first executing instance of the first containerized function. This can be a current instance of the first containerized function that executes in a container separate from the second containerized function, and can be terminated because the deployed image (that comprises the first containerized function) has now been deployed.

After operation 814, process flow 800 moves to operation 816.

Operation 816 depicts terminating a second executing instance of the second containerized function. In some examples, operation 816 can be implemented in a similar manner as operation 814, as applied to the second containerized function (compared to the first containerized function in operation 814).

After operation 816, process flow 800 moves to operation 818.

Operation 818 depicts directing a first call to invoke the first containerized function to the deployed image. That is, with the deployed image, calls to both the first containerized function and the second containerized function can go to the deployed image (which can be referred to as a fused container), and a request handler can route calls to the appropriate function within the container.

After operation 818, process flow 800 moves to operation 820.

Operation 820 depicts directing a second call to invoke the second containerized function to the deployed image. In some examples, operation 820 can be implemented in a similar manner as operation 818, as applied to the second containerized function (compared to the first containerized function in operation 818).

After operation 820, process flow 800 moves to 822, where process flow 800 ends.

Figure 9:
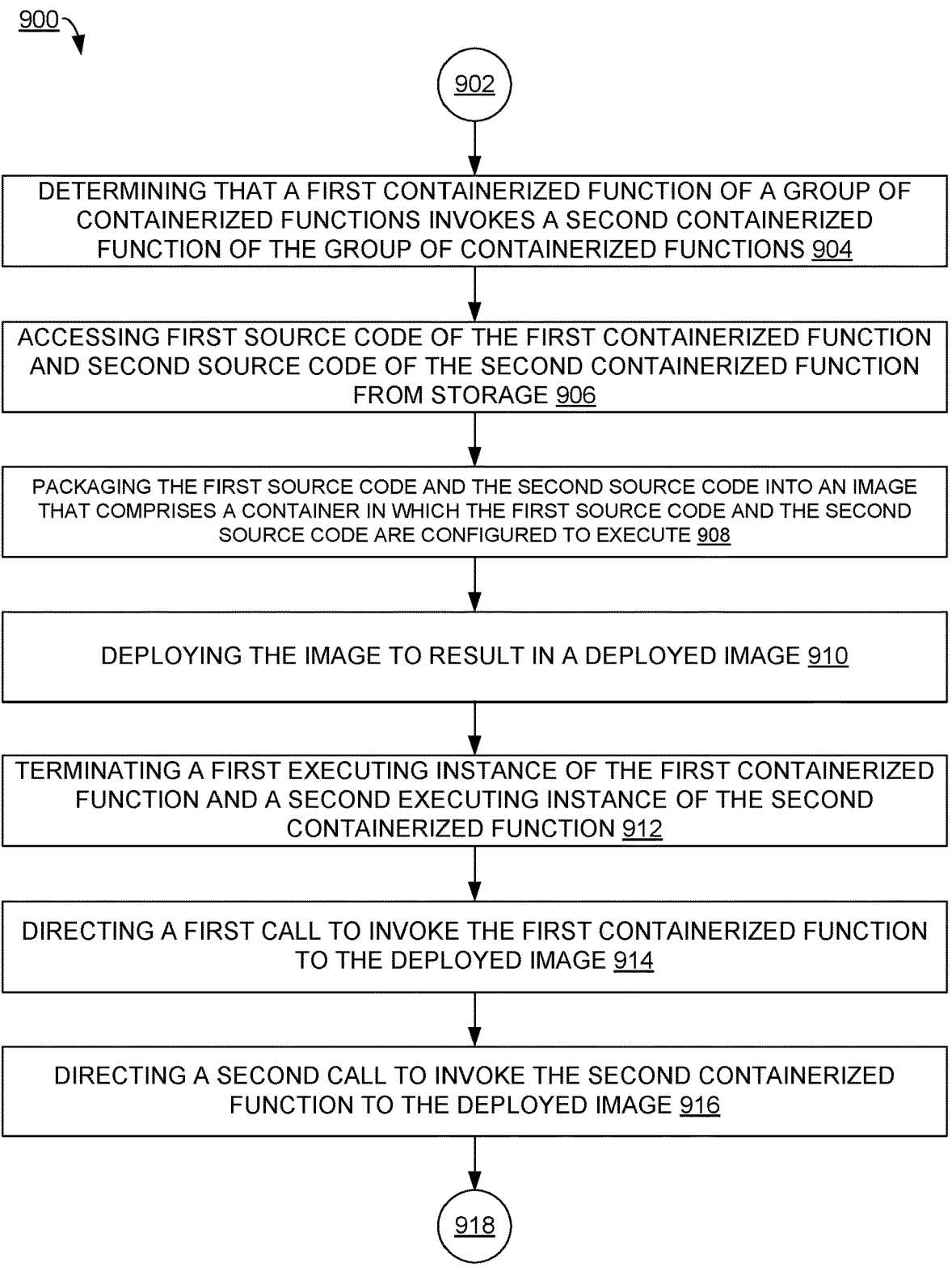
FIG. 9 illustrates another example process flow that can facilitate FaaS fusion deployment, in accordance with an embodiment of this disclosure.

FIG. 9 illustrates another example process flow 900 that can facilitate FaaS fusion deployment, in accordance with an embodiment of this disclosure. In some examples, one or more embodiments of process flow 900 can be implemented by FaaS fusion deployment component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 800 of FIG. 8, and/or process flow 1000 of FIG. 10.

Process flow 900 begins with 902, and moves to operation 904.

Operation 904 depicts determining that a first containerized function of a group of containerized functions invokes a second containerized function of the group of containerized functions. In some examples, operation 904 can be implemented in a similar manner as operation 804 of FIG. 8.

In some examples, operation 904 is performed based on a dynamic analysis of executing the first containerized function. That is, dynamic analysis of the functions as they operate can be performed to identify cascading functions.

In some examples, dynamic analysis comprises determining a percentage of time that the first containerized function and the second containerized function are invoked together. That is, it can be determined whether two functions are called together above a predefined system parameter percentage of the time.

In some examples, dynamic analysis comprises determining that an amount of time between invoking the first containerized function and invoking the second containerized function is less than a predetermined threshold value. That is, it can be determined whether two functions are called with a time difference within a predefined system parameter amount of time of each other.

In some examples where dynamic analysis is performed, operation 904 can comprise performing the dynamic analysis for a defined amount of time. That is, sampling can be performed through a period of time (which can be a predefined system parameter), and then a determination can be made about fusing functions.

In some examples where dynamic analysis is performed, operation 904 can comprise performing the dynamic analysis for a defined number of invocations of respective functions of the group of containerized functions. That is, sampling can be performed for a number of requests (which can be a predefined system parameter), and then a determination can be made about fusing functions.

After operation 904, process flow 900 moves to operation 906.

Operation 906 depicts accessing first source code of the first containerized function and second source code of the second containerized function from storage. In some examples, operation 906 can be implemented in a similar manner as operations 806-808 of FIG. 8.

After operation 906, process flow 900 moves to operation 908.

Operation 908 depicts packaging the first source code and the second source code into an image that comprises a container in which the first source code and the second source code are configured to execute. In some examples, operation 908 can be implemented in a similar manner as operation 810 of FIG. 8.

After operation 908, process flow 900 moves to operation 910.

Operation 910 depicts deploying the image to result in a deployed image. In some examples, operation 910 can be implemented in a similar manner as operation 812 of FIG. 8.

After operation 910, process flow 900 moves to operation 912.

Operation 912 depicts terminating a first executing instance of the first containerized function and a second executing instance of the second containerized function. In some examples, operation 912 can be implemented in a similar manner as operations 814-816 of FIG. 8.

After operation 912, process flow 900 moves to operation 914.

Operation 914 depicts directing a first call to invoke the first containerized function to the deployed image. In some examples, operation 914 can be implemented in a similar manner as operation 818 of FIG. 8.

After operation 914, process flow 900 moves to operation 916.

Operation 916 depicts directing a second call to invoke the second containerized function to the deployed image. In some examples, operation 916 can be implemented in a similar manner as operation 820 of FIG. 8.

After operation 916, process flow 900 moves to 918, where process flow 900 ends.

FIG. 10 illustrates another example process flow 1000 that can facilitate FaaS fusion deployment, in accordance with an embodiment of this disclosure. In some examples, one or more embodiments of process flow 1000 can be implemented by FaaS fusion deployment component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 800 of FIG. 8, and/or process flow 900 of FIG. 9.

Process flow 1000 begins with 1002, and moves to operation 1004.

Operation 1004 depicts determining that a first containerized function of a group of containerized functions invokes a second containerized function of the group of containerized functions. In some examples, operation 1004 can be implemented in a similar manner as operation 804 of FIG. 8.

After operation 1004, process flow 1000 moves to operation 1006.

Operation 1006 depicts accessing first source code of the first containerized function and second source code of the second containerized function from a repository. In some examples, operation 1006 can be implemented in a similar manner as operations 806-808 of FIG. 8.

After operation 1006, process flow 1000 moves to operation 1008.

Operation 1008 depicts packaging the first source code and the second source code into a container in which the first source code and the second source code are configured to execute. In some examples, operation 1008 can be implemented in a similar manner as operation 810 of FIG. 8.

In some examples, operation 1008 comprises merging a first function dependency package associated with the first source code with a second function dependency package associated with the second source code. That is, packages can be upgraded to a latest version in a case of collision, and/or a manual consolidation of packages can be performed.

In some examples, operation 1008 comprises wrapping the first source code in a first module that is associated with a first runtime language of the first source code, and wrapping the second source code in a second module that is associated with a second runtime language of the second source code. That is, each function can be wrapped in a different module based on its runtime language (e.g., package name or directory).

In some examples, operation 1008 comprises routing a handler of the container to map names associated with containerized functions to routes or event names. That is, an HTTP route handler can trigger an appropriate function module based on a compatible function trigger. A HTTP handler that triggers a single function can serve as a router that maps function names to HTTP routes or event names, which can facilitate a selective trigger of a relevant function.

After operation 1008, process flow 1000 moves to operation 1010.

Operation 1010 depicts deploying the container to produce a deployed container. In some examples, operation 1010 can be implemented in a similar manner as operation 812 of FIG. 8.

After operation 1010, process flow 1000 moves to operation 1012.

Operation 1012 depicts directing a first call to invoke the first containerized function to the deployed container. In some examples, operation 1012 can be implemented in a similar manner as operation 818 of FIG. 8.

After operation 1012, process flow 1000 moves to operation 1014.

Operation 1014 depicts directing a second call to invoke the second containerized function to the deployed container. In some examples, operation 1014 can be implemented in a similar manner as operation 820 of FIG. 8.

In some examples, a first amount of time associated with sequentially executing the first containerized function and the second containerized function in the deployed container is less than a second amount of time associated with sequentially executing the first containerized function and the second containerized function in respective different containers. That, is the present techniques can be implemented to improve system performance in comparison to an equivalent serverless function deployment without function fusing.

In some examples, a first amount of computing resources associated with sequentially executing the first containerized function and the second containerized function in the deployed container is less than a second amount of computing resources associated with sequentially executing the first containerized function and the second containerized function in respective different containers. That, is the present techniques can be implemented to reduce resource consumption in comparison to an equivalent serverless function deployment without function fusing.

After operation 1014, process flow 1000 moves to 1016, where process flow 1000 ends.

Example Operating Environment

Figure 11:
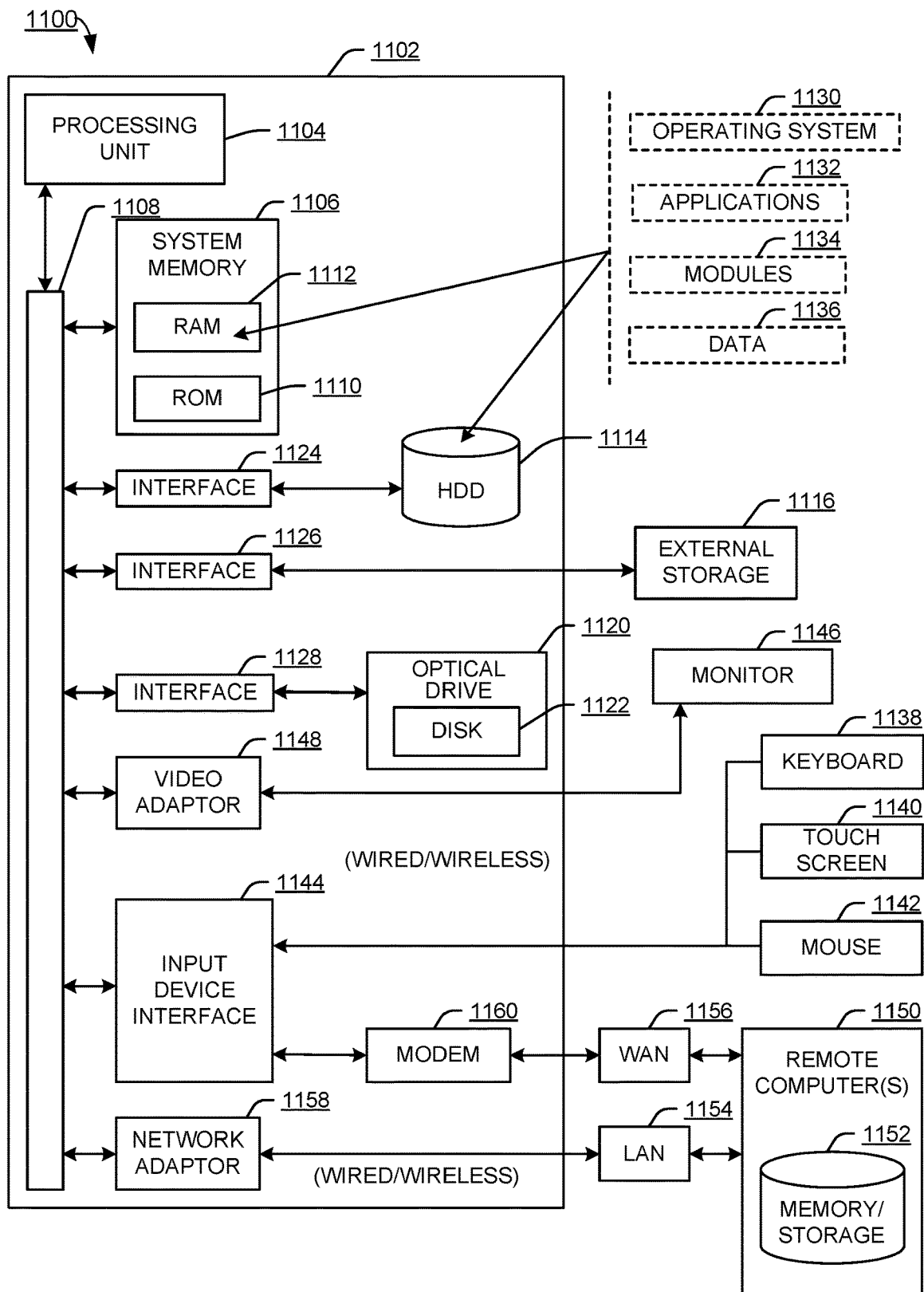
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or remote computer 106 of FIG. 1.

In some examples, computing environment 1100 can implement one or more embodiments of the process flows of FIGS. 6 and/or 8-10 to facilitate FaaS fusion deployment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component." "module," "system," "interface." "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that, in response to execution by the at least one processor, cause the system to perform operations, comprising:
   determining that a first containerized function of a group of containerized functions invokes a second containerized function of the group of containerized functions;
   accessing first source code of the first containerized function from a repository;
   accessing second source code of the second containerized function from the repository;
   packaging the first source code and the second source code into an image that comprises a container in which the first source code and the second source code are configured to execute;
   deploying the image to produce a deployed image;
   terminating a first executing instance of the first containerized function;
   terminating a second executing instance of the second containerized function;
   directing a first call to invoke the first containerized function to the deployed image; and
   directing a second call to invoke the second containerized function to the deployed image.

2. The system of claim 1, wherein the determining that the first containerized function invokes the second containerized function is based on a static analysis of the first source code of the first containerized function, and independently of executing the first source code.

3. The system of claim 2, wherein the operations further comprise:
   generating a graph based on source code of the group of containerized functions, wherein the source code comprises the first source code and the second source code, wherein the graph comprises nodes that represent respective functions of the group of containerized functions and edges that represent invocations between the respective functions, and wherein the static analysis is based on the graph.

4. The system of claim 3, wherein the graph comprises paths of invocations in the graph, and wherein the static analysis comprises identifying a path of the paths that is a longest path of the paths.

5. The system of claim 3, wherein respective containerized functions of the group of containerized functions are associated with respective code sizes, and wherein the static analysis is based on the respective code sizes.

6. The system of claim 3, wherein respective containerized functions of the group of containerized functions are associated with respective package sizes, and wherein the static analysis is based on the respective package sizes.

7. The system of claim 1, wherein the packaging and the deploying are performed by a continuous integration and continuous deployment component.

8. The system of claim 7, wherein the continuous integration and continuous deployment component is configured to, based on the packaging and deploying, prevent building and deploying the first containerized function and the second containerized function in separate containers.

9. A method, comprising:
   determining, by a system comprising at least one processor, that a first containerized function of a group of containerized functions invokes a second containerized function of the group of containerized functions;
   accessing, by the system, first source code of the first containerized function and second source code of the second containerized function from storage;
   packaging, by the system, the first source code and the second source code into an image that comprises a container in which the first source code and the second source code are configured to execute;
   deploying, by the system, the image to result in a deployed image;
   terminating, by the system, a first executing instance of the first containerized function and a second executing instance of the second containerized function;
   directing, by the system, a first call to invoke the first containerized function to the deployed image; and
   directing, by the system, a second call to invoke the second containerized function to the deployed image.

10. The method of claim 9, wherein the determining that the first containerized function invokes the second containerized function is performed based on a dynamic analysis of executing the first containerized function.

11. The method of claim 10, wherein the dynamic analysis comprises:
    determining, by the system, a percentage of time that the first containerized function and the second containerized function are invoked together.

12. The method of claim 10, wherein the dynamic analysis comprises:
    determining, by the system, that an amount of time between invoking the first containerized function and invoking the second containerized function is less than a predetermined threshold value.

13. The method of claim 10, further comprising:
    performing, by the system, the dynamic analysis for a defined amount of time.

14. The method of claim 10, further comprising:
    performing, by the system, the dynamic analysis for a defined number of invocations of respective functions of the group of containerized functions.

15. A non-transitory computer-readable medium comprising instructions that, in response to execution, cause a system comprising at least one processor to perform operations, comprising:
    determining that a first containerized function of a group of containerized functions invokes a second containerized function of the group of containerized functions;
    accessing first source code of the first containerized function and second source code of the second containerized function from a repository;
    packaging the first source code and the second source code into a container in which the first source code and the second source code are configured to execute;
    deploying the container to produce a deployed container;
    directing a first call to invoke the first containerized function to the deployed container; and
    directing a second call to invoke the second containerized function to the deployed container.

16. The non-transitory computer-readable medium of claim 15, wherein packaging the first source code and the second source code into the container comprises:
    merging a first function dependency package associated with the first source code with a second function dependency package associated with the second source code.

17. The non-transitory computer-readable medium of claim 15, wherein packaging the first source code and the second source code into the container comprises:
- wrapping the first source code in a first module that is associated with a first runtime language of the first source code; and
- wrapping the second source code in a second module that is associated with a second runtime language of the second source code.

18. The non-transitory computer-readable medium of claim 15, wherein packaging the first source code and the second source code into the container comprises:
- routing a handler of the container to map names associated with containerized functions to routes or event names.

19. The non-transitory computer-readable medium of claim 15, wherein a first amount of time associated with sequentially executing the first containerized function and the second containerized function in the deployed container is less than a second amount of time associated with sequentially executing the first containerized function and the second containerized function in respective different containers.

20. The non-transitory computer-readable medium of claim 15, wherein a first amount of computing resources associated with sequentially executing the first containerized function and the second containerized function in the deployed container is less than a second amount of computing resources associated with sequentially executing the first containerized function and the second containerized function in respective different containers.

* * * * *